P. WITTE.
STAGE SCREW.
APPLICATION FILED FEB. 7, 1914.

1,103,723.

Patented July 14, 1914.

Witnesses
F. R. Moran
Dudley B. Howard

Inventor
Paul Witte.
By Victor J. Evans
Attorney

UNITED STATES PATENT OFFICE.

PAUL WITTE, OF DECATUR, ILLINOIS.

STAGE-SCREW.

1,103,723.

Specification of Letters Patent.

Patented July 14, 1914.

Application filed February 7, 1914. Serial No. 817,308.

*To all whom it may concern:*

Be it known that I, PAUL WITTE, a citizen of the United States, residing at Decatur, in the county of Macon and State of Illinois, have invented new and useful Improvements in Stage-Screws, of which the following is a specification.

This invention relates to wood screws and in particular to a stage screw for use in connecting the parts of stage scenery or in securing the scenery to the theater stage itself.

The primary object of the invention is to provide a screw of this character which includes a manipulating member and means for securing a wood screw of the ordinary well known type thereto, in such a manner that a unitary structure is formed which may be used repeatedly, as is necessary in stage work, until the threads of the screw proper become worn to a dangerous extent, whereupon the worn screw may be replaced readily by another screw of the same kind.

A further object is to provide a manipulating member and securing means for the screw proper which are simple in construction and readily operable, whereby a screw may be readily attached thereto or detached therefrom, and which may be manufactured at a small cost.

Figure 1:
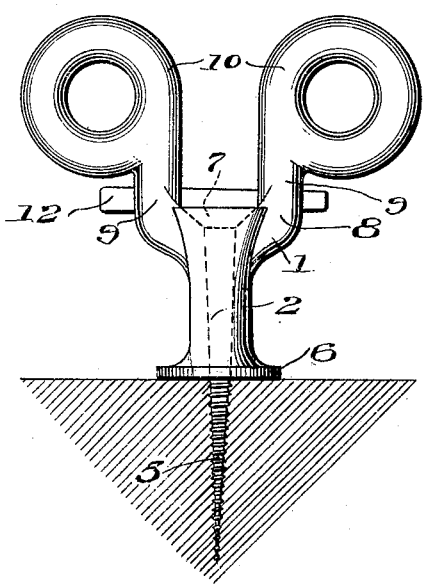
Figure 2:
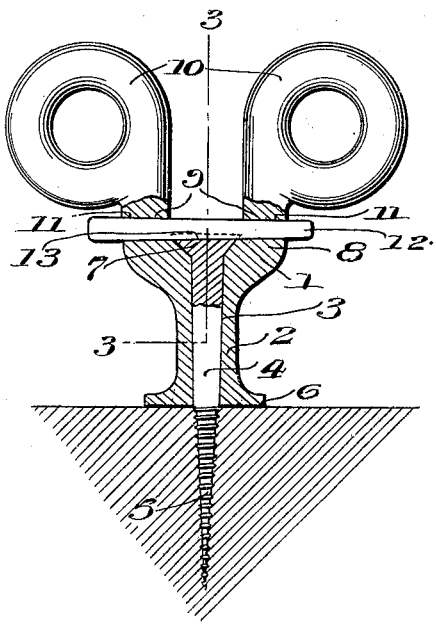
Figure 3:
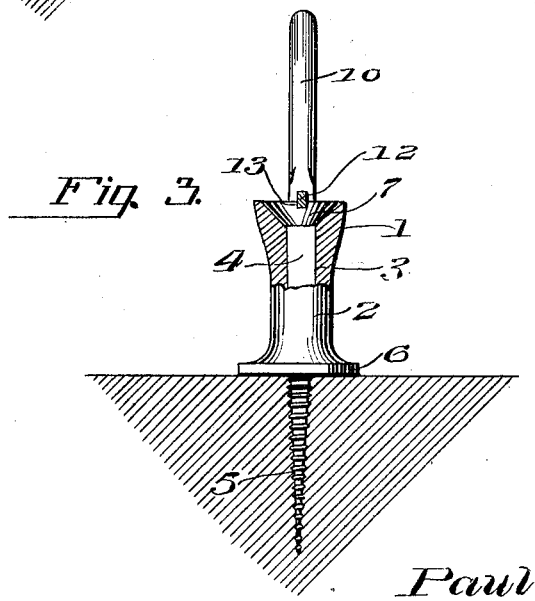

The invention consists in the features of construction, combination, and arrangement of parts hereinafter fully described and claimed, reference being had to the accompanying drawing, in which:

Figure 1 is a side elevation of the device, showing the screw proper in its applied position; Fig. 2 is a longitudinal sectional view; and Fig. 3 is a similar view on line 3—3 of Fig. 2.

In the drawing, the numeral 1 designates the manipulating member which is preferably cast from iron, brass, or some other suitable metal, and which includes a cylindrical body portion 2 having a longitudinal bore 3 for the reception of the cylindrical shank 4 of the ordinary type of wood screw which is to be used as a complement of the manipulating member in the composition of the stage screw. The threaded portion 5 of the screw is adapted to project below the annular limiting flange 6 formed upon the lower end of the body portion of the manipulating member, whereas its head 7 is adapted to rest within the flared upper portion 8 of the body bore. A pair of parallel arms 9 are formed upon the sides of the body portion 2 at the upper end thereof and project upwardly for a short distance. Flat, laterally projecting wings 10 are formed upon the upper ends of the respective arms 9 to afford means by which the manipulating member may be grasped conveniently and effectively in operating the screw. The arms 9 are further provided in communication with the flared portion 8 of the body bore with transversely alining rectangular slots 11 for the reception of a securing wedge 12, which is constructed comparatively thin so that its lower edge is adapted to engage within the transverse kerf 13 in the head of the screw, whereby the screw will be held securely against rotation with respect to the manipulating member. The tapered faces of the wedge are its upper and lower edges, and it should be understood that the said wedge may be forced into its tight, operative position within the receiving slots by striking the larger end of the same with a hammer or some such driving tool, and that it may be released by striking the opposite end thereof, owing to the fact that both ends of the wedge are adapted to protrude from the arm slots of the manipulating member to a sufficient extent. The protruding ends of the wedge, however, are shielded by the wings 10 which overlie the same, so that the wedge is not apt to be loosened accidentally during its use by engagement with any obstruction.

From the foregoing description, taken in connection with the accompanying drawings, it should be apparent that I have provided a simply constructed and efficient stage screw which is adapted to include in its construction the ordinary type of wood screw, which is usually operated by a screw driver, whereby it is rendered unnecessary to provide any special type of screw proper, these ordinary wood screws being adapted to be used interchangeably with the single manipulating member, as each screw becomes worn excessively and it is found necessary to replace the same by a new one. The manipulating member and securing wedge may thus be manufactured at a small cost and will be practicably indestructible so that they may be used indefinitely, it being merely necessary to replace the screw proper from time to time.

What is claimed is:

1. In a device of the class described, the combination with an ordinary wood screw, of a winged manipulating member having a bore adapted to receive removably the shank of the screw, the threaded portion of the screw being adapted to protrude therefrom, means for securing the screw within the said bore, the said means being adapted to prevent rotation of the screw therein, and a limiting flange formed upon the lower end of the manipulating member adjacent to the threaded portion of the screw.

2. In a device of the class described, the combination with an ordinary wood screw, of a winged manipulating member having a bore adapted to receive removably the shank of the screw, the threaded portion of the screw being adapted to protrude therefrom, the upper end of the said bore being provided with a flared portion for the reception of the screw head, the said member being provided further with transversely alining slots in communication with the said flared portion of the bore, and a securing wedge adapted to be mounted within the said slots with its inner edge engaged in the head kerf of the screw.

3. In a device of the class described, the combination with an ordinary wood screw, of a winged manipulating member having a bore adapted to receive removably the shank of the screw, the threaded portion of the screw being adapted to protrude therefrom, the upper end of the said bore being provided with a flared portion for the reception of the screw head, the said member being provided further with transversely alining slots in communication with the said flared portion of the bore, and a securing wedge adapted to be mounted within the said slots with its inner edge engaged in the head kerf of the screw, the ends of the wedge being adapted to protrude from the slots of the manipulating member and the wings of the said member being arranged so as to overlie the said wedge ends.

In testimony whereof I affix my signature in presence of two witnesses.

PAUL WITTE.

Witnesses:
JOHN FRANCIS,
JOHN DAYTON.

---

Copies of this patent may be obtained for five cents each, by addressing the "Commissioner of Patents, Washington, D. C."